United States Patent
Kim et al.

(10) Patent No.: US 12,007,293 B2
(45) Date of Patent: Jun. 11, 2024

(54) PRESSURE SENSOR USING CONDUCTIVE THREAD AND METHOD OF MANUFACTURING THE SAME

(71) Applicant: KOREA ELECTRONICS TECHNOLOGY INSTITUTE, Seongnam-si (KR)

(72) Inventors: Won Hyo Kim, Yongin-si (KR); Woo Kyeong Seong, Seongnam-si (KR); Kook Nyung Lee, Seoul (KR); Su Mi Yoon, Anyang-si (KR); Dong Ki Hong, Pyeongtaek-si (KR); Young Joo Kim, Seoul (KR); Hye Lim Kang, Chungcheongbuk-do (KR)

(73) Assignee: Korea Electronics Technology Institute, Seongnam-si (KR)

( * ) Notice: Subject to any disclaimer, the term of this patent is extended or adjusted under 35 U.S.C. 154(b) by 316 days.

(21) Appl. No.: 17/452,748

(22) Filed: Oct. 28, 2021

(65) Prior Publication Data

US 2022/0136914 A1   May 5, 2022

(30) Foreign Application Priority Data

Nov. 3, 2020 (KR) .......................... 10-2020-0145299

(51) Int. Cl.
*G01L 1/20* (2006.01)
*G06F 3/045* (2006.01)
*H05B 3/34* (2006.01)

(52) U.S. Cl.
CPC .............. *G01L 1/205* (2013.01); *G06F 3/045* (2013.01); *H05B 3/347* (2013.01)

(58) Field of Classification Search
CPC .......... G01L 1/205; G06F 3/045; H05B 3/347
See application file for complete search history.

(56) References Cited

U.S. PATENT DOCUMENTS 4,503,416 A * 3/1985 Kim ...................... H01C 10/10
  178/18.05
5,302,936 A * 4/1994 Yaniger ..................... G01L 1/20
  252/502

(Continued)

FOREIGN PATENT DOCUMENTS

KR       10-1301277 B1    8/2013
KR   10-2017-0003101 A    1/2017

(Continued)

OTHER PUBLICATIONS

KR20180117891, machine translation. (Year: 2018).*

(Continued)

*Primary Examiner* — Kyung S Lee
(74) *Attorney, Agent, or Firm* — Knobbe, Martens, Olson, & Bear, LLP

(57) ABSTRACT

Disclosed are a pressure sensor using conductive thread, the pressure sensor including a plurality of first conductive lines arranged parallel to each other in a first direction in a state of being spaced apart from each other, a plurality of second conductive lines arranged parallel to each other in a second direction intersecting the first direction in a state of being spaced apart from each other, and a spacer located between the plurality of first conductive lines and the plurality of second conductive lines, resistance of the spacer being changed when pressure is applied thereto, whereby it is possible to measure a wide range of pressure with elasticity and flexibility, and a method of manufacturing the same.

11 Claims, 15 Drawing Sheets

(56) References Cited

U.S. PATENT DOCUMENTS

| | | | | |
|---|---|---|---|---|
| 5,550,339 A * | 8/1996 | Haugh | ................. | H01H 13/702 338/99 |
| 6,452,479 B1 * | 9/2002 | Sandbach | ............... | G06F 3/045 338/114 |
| 2010/0225488 A1 * | 9/2010 | Hinterlong | ............. | G08B 25/14 455/41.2 |
| 2012/0256838 A1 * | 10/2012 | Lee | ........................ | H01C 10/10 345/174 |
| 2022/0136914 A1 * | 5/2022 | Kim | ........................ | G01L 1/205 338/47 |

FOREIGN PATENT DOCUMENTS

| | | |
|---|---|---|
| KR | 10-2018-0117891 A | 10/2018 |
| KR | 10-2019-0141434 A | 12/2019 |

OTHER PUBLICATIONS

KR20190141434, machine translation. (Year: 2019).*
Office Action dated Oct. 28, 2021 in Korean Application No. 10-2020-0145299, in 8 pages.

\* cited by examiner

PRESSURE SENSOR USING CONDUCTIVE THREAD AND METHOD OF MANUFACTURING THE SAME

CROSS REFERENCE TO RELATED APPLICATION

The present application claims priority to Korean Patent Application No. 10-2020-0145299, filed Nov. 3, 2020, the entire contents of which is incorporated herein for all purposes by this reference.

BACKGROUND OF THE INVENTION

Field of the Invention

The present invention relates to a pressure sensor using conductive thread and a method of manufacturing the same.

Description of the Related Art

With development of electronics, wearable devices, such as smart watches and smart glasses, have newly appeared. However, current wearable devices are limited to watch type products and necklace type products, and clothing type wearable devices are not widespread. Clothing essentially requires elasticity and flexibility. Sensors used in conventional wearable devices are difficult to use in clothing type wearable devices, since the sensors have no elasticity and flexibility. In particular, a conventional pressure sensor is a chip type sensor or a sensor including an element configured to be physically deformed when pressure is applied thereto, and therefore it is difficult to secure elasticity and flexibility.

RELATED ART DOCUMENTS

Patent Documents (Patent Document 1) KR 10-1301277 B1

SUMMARY OF THE INVENTION

It is an object of the present invention to provide a pressure sensor using conductive thread configured such that a spacer having resistance changed when pressure is applied thereto is disposed between a first conductive line and a second conductive line formed using fabric made of conductive thread and a method of manufacturing the same.

It is another object of the present invention to provide a pressure sensor using conductive thread configured such that resistors permeate the area of the spacer corresponding to the area in which the first conductive line and the second conductive line intersect each other to form a resistance area and such that pressure is sensed using a change in resistance of the resistance area generated when pressure is applied thereto and a method of manufacturing the same.

In accordance with an aspect of the present invention, the above and other objects can be accomplished by the provision of a pressure sensor using conductive thread, the pressure sensor including a plurality of first conductive lines arranged parallel to each other in a first direction in a state of being spaced apart from each other, a plurality of second conductive lines arranged parallel to each other in a second direction intersecting the first direction in a state of being spaced apart from each other, and a spacer located between the plurality of first conductive lines and the plurality of second conductive lines, resistance of the spacer being changed when pressure is applied thereto.

The spacer may be provided with a resistance area formed in a cross area in which each of the plurality of first conductive lines and a corresponding one of the plurality of second conductive lines intersect each other, wherein resistance of the resistance area may be changed in response to a change in pressure.

The spacer may be made of porous fabric, and the resistance area may be formed such that a plurality of resistors is inserted into the fabric in the state in which at least some of the resistors are spaced apart from each other and such that, when pressure is applied thereto, at least some of the resistors contact each other, whereby resistance is reduced.

The resistance area may be formed in plurality in the cross area in which the first conductive line and the second conductive line intersect each other.

The plurality of resistance areas may be formed such that the resistors in each of the resistance areas have a different density than the resistors in the other resistance areas.

Each of the first conductive line and the second conductive line may be fabric made of conductive thread and may have a predetermined width and length, the spacer may be configured such that a first slit having a size corresponding to the width of the first conductive line is formed between two resistance areas neighboring each other in the first direction, among the resistance areas, and a second slit having a size corresponding to the width of the second conductive line is formed between two resistance areas neighboring each other in the second direction, among the resistance areas, the first conductive line may be formed so as to pass through the first slit from a first surface to a second surface of the spacer and to pass through another first slit closest thereto from the second surface to the first surface of the spacer, and the second conductive line may be formed so as to pass through the second slit from the second surface to the first surface of the spacer and to pass through another second slit closest thereto from the first surface to the second surface of the spacer, whereby the first conductive lines and the second conductive lines may be formed so as to be alternately located on the first surface of the spacer.

The pressure sensor may further include a base sheet configured to support the first conductive line, the spacer, and the second conductive line, a plurality of first electrodes, each of which is connected to one end of a corresponding one of the plurality of first conductive lines, a plurality of second electrodes, each of which is connected to one end of a corresponding one of the plurality of second conductive lines, a seam configured to fix the base sheet, the first conductive line, the spacer, and the second conductive line, and a cover sheet configured to cover the connection portion between the first electrode and the first conductive line and the connection portion between the second electrode and the second conductive line, wherein each of the first conductive line and the second conductive line may be fabric made of conductive thread and may have a predetermined width and length.

The resistance area may be formed so as to have a thickness of 300 µm or more.

In accordance with another aspect of the present invention, there is provided a method of manufacturing a pressure sensor using conductive thread, the method including preparing a plurality of first conductive lines and a plurality of second conductive lines, preparing a spacer having a plurality of pressure areas formed therein, the spacer being configured such that resistance of the spacer is changed when pressure is applied thereto, disposing the plurality of first conductive lines so as to be spaced apart from each other in a state of being parallel to each other in a first direction, disposing the plurality of second conductive lines so as to be spaced apart from each other in a state of being parallel to each other in a second direction intersecting the first direction, and coupling the first conductive line and the second conductive line to the spacer such that the spacer is disposed between the first conductive line and the second conductive line, and connecting a first electrode to one end of the first conductive line, connecting a second electrode to one end of the second conductive line, and coupling a cover sheet configured to cover an area in which the electrodes are connected to each other.

The step of preparing the spacer may include a resistance area formation step of forming resistors in a cross area of a spacer made of porous fabric in which the first conductive line and the second conductive line intersect each other.

The resistance area formation step may include allowing a solution including the resistors to permeate the resistance area and thermally treating the spacer to fix the resistors to the porous fabric.

The resistance area formation step may include allowing a solution including a first concentration of the resistors to permeate a portion of the cross area in which the first conductive line and the second conductive line intersect each other to form a first concentration of resistance area, allowing a solution including a second concentration of the resistors to permeate another portion of the cross area in which the first conductive line and the second conductive line intersect each other to form a second concentration of resistance area, and thermally treating the spacer such that the resistors are fixed to the porous fabric to form one or more resistance areas having different concentrations in a portion of the cross area in which the first conductive line and the second conductive line intersect each other.

The step of coupling the first conductive line and the second conductive line to the spacer may include coupling the plurality of first conductive lines to a base sheet so as to be spaced apart from each other in a state of being parallel to each other in the first direction, coupling the spacer to the base sheet such that the spacer covers the first conductive lines and such that resistance areas overlap the first conductive lines, and coupling the plurality of second conductive lines to the base sheet so as to be spaced apart from each other in a state of being parallel to each other in the second direction intersecting the first direction such that the second conductive lines cover the resistance areas.

The step of coupling the first conductive line and the second conductive line to the spacer may include a slit formation step of forming a first slit corresponding to the width of the first conductive line between two resistance areas parallel to each other in the first direction, among a plurality of resistance areas formed in the spacer, and forming a second slit corresponding to the width of the second conductive line between two resistance areas parallel to each other in the second direction, a slit passing step of allowing the first conductive line to pass through the first slit from a first surface to a second surface of the spacer and to pass through another first slit closest thereto from the second surface to the first surface of the spacer and allowing the second conductive line to pass through the second slit from the second surface to the first surface of the spacer and to pass through another second slit closest thereto from the first surface to the second surface of the spacer, thereby coupling the first conductive line and the second conductive line to the spacer such that the first conductive line and the second conductive line are alternately located on the first surface of the spacer, and coupling the first conductive line, the second conductive line, and the spacer, coupled through the first slit and the second slit, to the base sheet.

The features and advantages of the present invention will be more clearly understood from the following detailed description taken in conjunction with the accompanying drawings.

It should be understood that the terms used in the specification and appended claims should not be construed as being limited to general and dictionary meanings, but should be construed based on meanings and concepts according to the spirit of the present invention on the basis of the principle that the inventor is permitted to define appropriate terms for the best explanation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
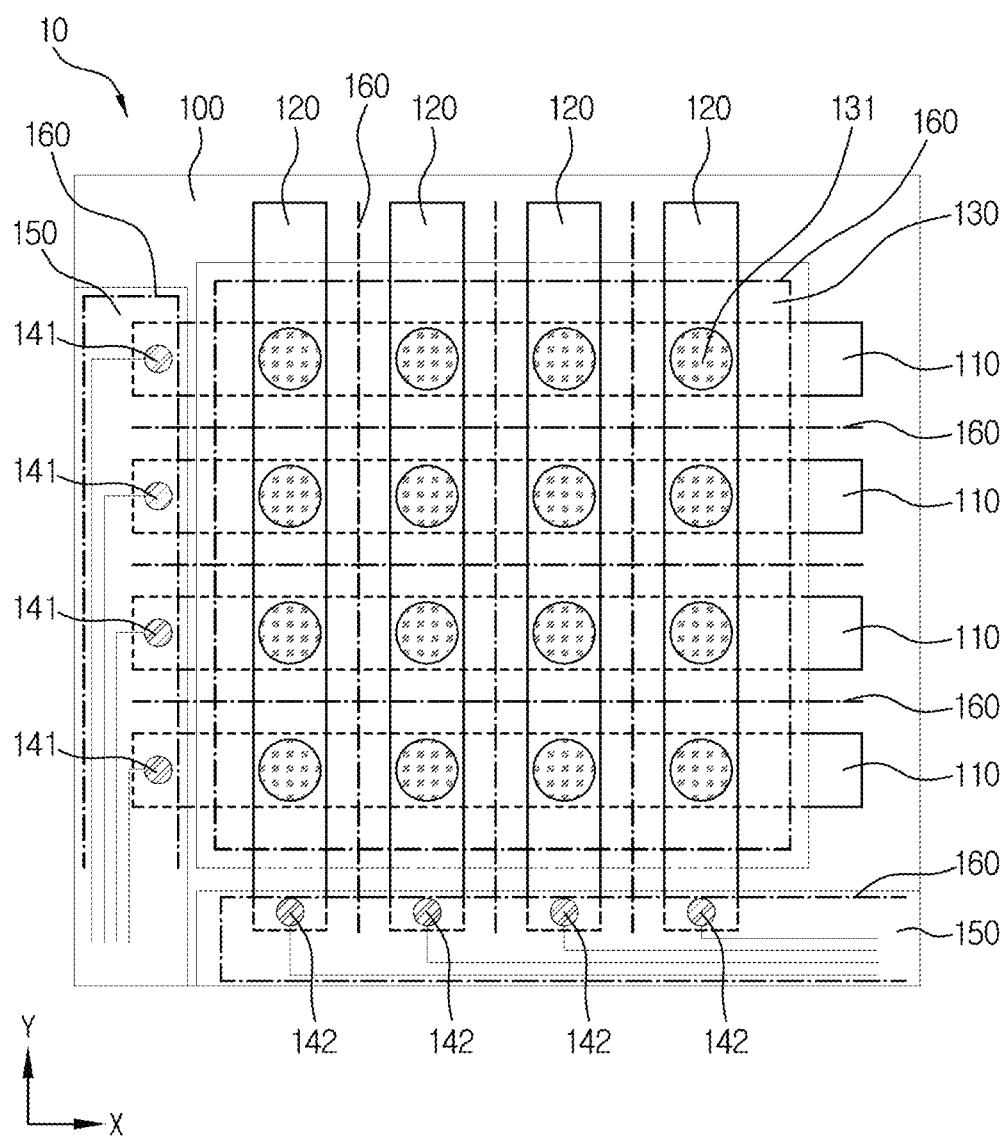
FIG. 1 is a view showing a pressure sensor using conductive thread according to an embodiment of the present invention.

Objects, advantages, and features of the present invention will be apparent from the following detailed description of embodiments with reference to the accompanying drawings. It should be noted that, when reference numerals are assigned to the elements of the drawings, the same reference numeral is assigned to the same elements even when they are illustrated in different drawings. In addition, the terms "one surface", "the other surface", "first", "second", etc. are used to distinguish one element from another, and elements are not limited by the terms. The expression "included" or "includes" may include a structure in which two elements are electrically or physically connected to each other via another element therebetween. For example, the expression "a first element is connected to a second element" may include a structure in which the first element is connected to a third element and the third element is connected to the second element. In the following description of embodiments of the present invention, a detailed description of related known technology will be omitted when the same may obscure the subject matter of the embodiments of the present invention.

Hereinafter, embodiments of the present invention will be described in detail with reference to the accompanying drawings.

Figure 2:
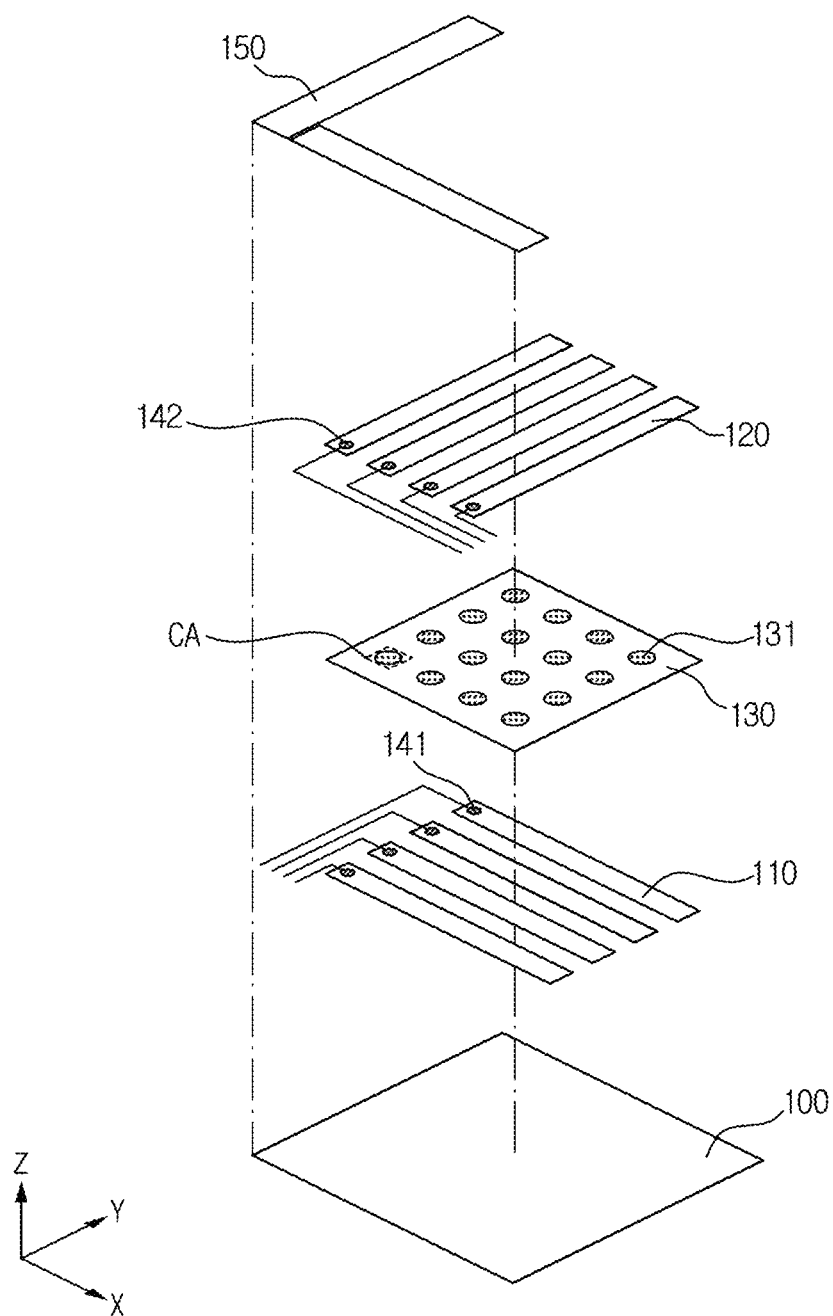
FIG. 2 is an exploded perspective view of the pressure sensor using conductive thread according to the embodiment of the present invention.
Figure 3:
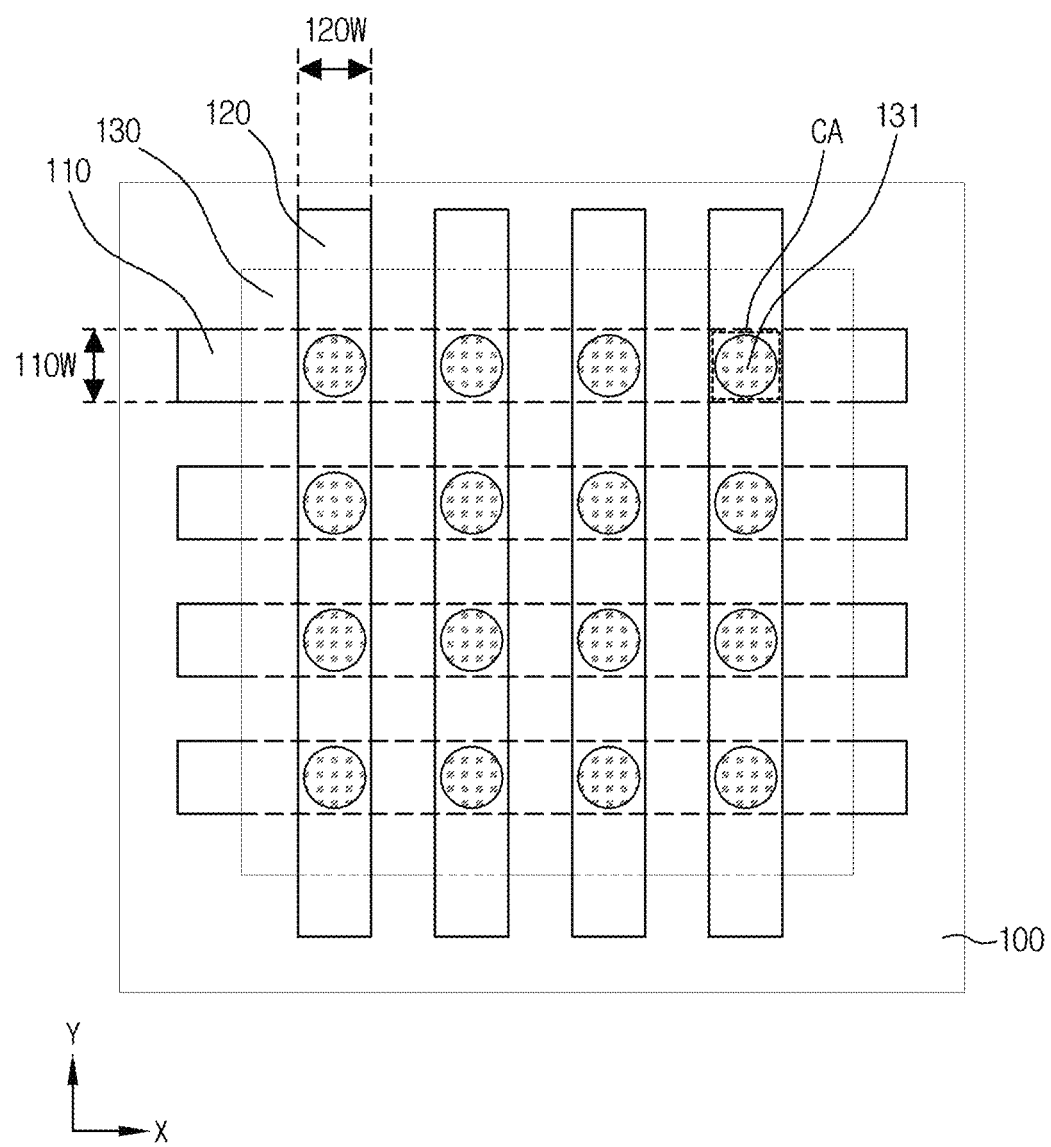
FIG. 3 is a plan view showing only a first conductive line, a spacer, and a second conductive line in the pressure sensor using conductive thread according to the embodiment of the present invention.
Figure 4:
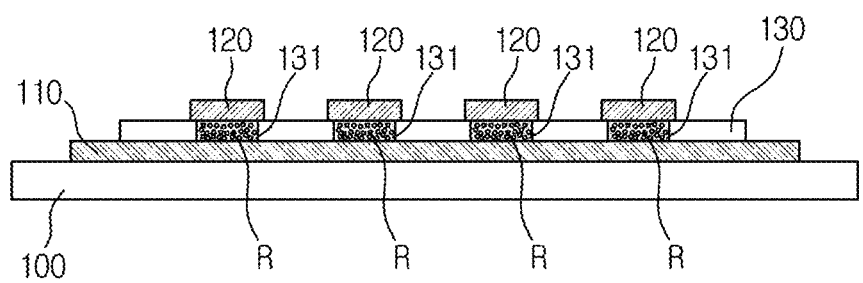
FIG. 4 is a sectional view taken along line A-A' of FIG. 3.

FIG. 1 is a view showing a pressure sensor 10 using conductive thread according to an embodiment of the present invention. FIG. 2 is an exploded perspective view of the pressure sensor 10 using conductive thread according to the embodiment of the present invention. FIG. 3 is a plan view showing only a first conductive line 110, a spacer 130, and a second conductive line 120 in the pressure sensor 10 using conductive thread according to the embodiment of the present invention. FIG. 4 is a sectional view taken along line A-A' of FIG. 3. FIGS. 1, 2, 3, and 4 are referenced together.

The pressure sensor 10 using conductive thread according to the embodiment of the present invention may include a plurality of first conductive lines 110 arranged parallel to each other in a first direction X in a state of being spaced apart from each other, a plurality of second conductive lines 120 arranged parallel to each other in a second direction Y intersecting the first direction X in a state of being spaced apart from each other, and a spacer 130 located between the plurality of first conductive lines 110 and the plurality of second conductive lines 120, resistance of the spacer being changed when pressure is applied thereto.

Each of the first conductive line 110 and the second conductive line 120 may be a single conductive thread, may be a conductive braiding thread formed using a plurality of conductive threads, or may be fabric formed using conductive thread. As shown in FIG. 2, each of the first conductive line 110 and the second conductive line 120 may be fabric made of conductive thread, and may be formed so as to have a predetermined width and length. Conductive thread is thread having electrical conductivity. Conductive thread may be formed by impregnating or coating thread with a conductive material. The conductive material may be conductive ink including metal particles, such as copper (Cu) or silver (Ag), or may include a conductive polymer material.

The first conductive line 110 and the second conductive line 120 may be formed so as to intersect each other. The plurality of first conductive lines 110 is disposed parallel to each other in the first direction X, and is disposed spaced apart from each other. Similarly, the plurality of second conductive lines 120 is disposed parallel to each other in the second direction Y, and is disposed spaced apart from each other. The first direction X and the second direction Y may be directions that intersect each other. Specifically, the first direction X and the second direction Y may be perpendicular to each other. The first direction X and the second direction Y may also be expressed as a row and a column.

The spacer 130 is disposed between the first conductive line 110 and the second conductive line 120. Resistance of the spacer 130 is changed when pressure is applied thereto.

The pressure sensor 10 using conductive thread may include a base sheet configured to support the first conductive line 110, the spacer 130, and the second conductive line 120, a plurality of first electrodes 141, each of which is connected to one end of a corresponding one of the plurality of first conductive lines 110, and a plurality of second electrodes 142, each of which is connected to one end of a corresponding one of the plurality of second conductive lines 120, and may further include a seam configured to fix the base sheet, the first conductive line 110, the spacer 130, and the second conductive line 120 and a cover sheet 150 configured to cover the connection portion between the first electrode 141 and the first conductive line 110 and the connection portion between the second electrode 142 and the second conductive line 120.

The base sheet supports and fixes the first conductive line 110, the spacer 130, the second conductive line 120, the first electrode 141, the second electrode 142, and the cover sheet 150. The base sheet may be made of electrically insulative fabric.

The first electrode 141 is connected to the first conductive line 110 to electrically connect the first conductive line 110 to an external circuit. The second electrode 142 is connected to the second conductive line 120 to electrically connect the second conductive line 120 to the external circuit. The first electrode 141 and the second electrode 142 may be fixed on the base sheet.

The cover sheet 150 protects the portion at which the first electrode 141 and the first conductive line 110 are connected to each other and the portion at which the second electrode 142 and the second conductive line 120 are connected to each other. The cover sheet 150 is disposed so as to cover the portion at which the electrode and the conductive line are connected to each other, and the portion is fixed to the cover sheet 150.

The first conductive line 110, the second conductive line 120, the spacer 130, and the cover sheet 150 may be fixed to each other using a sewing line 160. The sewing line 160 may be formed in the second direction Y so as to intersect the first conductive line 110, may be formed in the first direction X so as to intersect the second conductive line 120, may be formed along the circumference of the spacer 130, or may be formed along the circumference of the cover sheet 150. In the drawings, the sewing line 160 is shown as a dash-dotted line.

A change in resistance of the spacer 130 may be measured through the first conductive line 110 that contacts a first surface 130a of the spacer 130 and the second conductive line 120 that contacts a second surface 130b of the spacer 130. When a change in resistance of the spacer 130 is measured, pressure based on which the change in resistance is caused may be recognized. The external circuit may measure a change in resistance of the spacer 130 using the first electrode 141 and the second electrode 142, and may measure pressure through the change in resistance of the spacer 130.

The spacer 130 may be provided with a resistance area 131, which is formed in a cross area CA in which each of the plurality of first conductive lines 110 and a corresponding one of the plurality of second conductive lines 120 intersect each other. Resistance of the resistance area is changed in response to a change in pressure. The cross area CA is the area in which the first conductive line 110 and the second conductive line 120 intersect each other in a state of overlapping each other up and down. The cross area CA is present at every point at which the first conductive line 110 and the second conductive line 120 intersect each other. The cross area CA may be formed in a quadrangular shape having the width 110w of the first conductive line 110 as a vertical length and the width 120w of the second conductive line 120 as a horizontal length. The cross area CA may be present in number corresponding to the number obtained by multiplying the number of first conductive lines 110 by the number of second conductive lines 120. For example, in FIG. 3, the number of first conductive lines 110 is 4 and the number of second conductive lines 120 is 4, and therefore 16 (4×4) cross areas CA are present.

The spacer 130 may include a plurality of resistance areas 131. One resistance area 131 may be formed for each cross area CA. A change in resistance of one resistance area 131 may be measured through the first conductive line 110 that contacts one surface thereof and the second conductive line 120 that contacts the other surface thereof. The plurality of first conductive lines 110 and the plurality of second conductive lines 120 are disposed in a matrix. Consequently, the position of the point to which pressure is applied may be measured based on the position of the conductive line, resistance of which is changed.

The resistance area 131 may be formed at the position corresponding to the cross area CA. The resistance area 131 may be formed in a quadrangular shape, like the cross area CA, or may be formed in a circular shape, as shown in FIG. 1. The shape of the resistance area 131 may be changed. The resistance area 131 may be continuously formed so as to include one or more cross areas CA. The spacer 130 may be formed so as to have a combination of resistance areas 131 continuously formed so as to include one or more cross areas CA and a resistance area 131 formed so as to correspond to one cross area CA. When the resistance area 131 is formed so as to correspond to the cross area CA, the position of the resistance area 131 to which pressure is applied may be accurately measured. When the resistance area 131 is widely formed over several cross areas CA, the position of the resistance area 131 to which pressure is applied may be recognized as a range.

The spacer 130 may be made of porous fabric. The porous fabric includes fabric used to manufacture general clothing. Porosity includes a space naturally generated in fabric due to gaps between threads formed when the fabric is woven. Since each of the first conductive line 110 and the second conductive line 120 is fabric formed using conductive thread and the spacer 130 is made of porous fabric, the pressure sensor may be deformed without being damaged when external pressure is applied thereto.

Figure 5A:
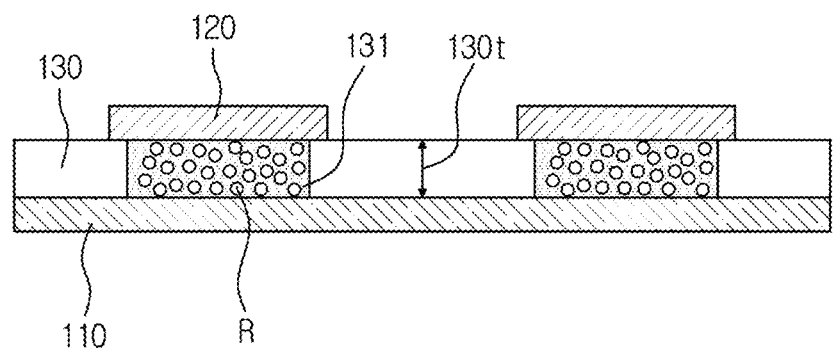
FIGS. 5A, and 5B are a view illustrating a change in resistance of the spacer when pressure is applied to the pressure sensor using conductive thread according to the embodiment of the present invention.
Figure 5B:
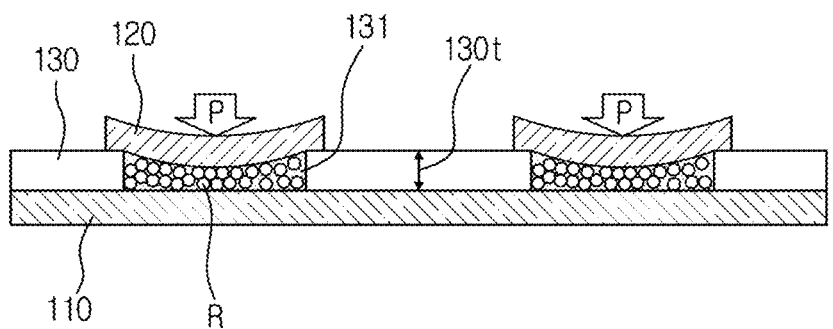

FIGS. 5A and 5B are a view illustrating a change in resistance of the spacer 130 when pressure is applied to the pressure sensor 10 using conductive thread according to the embodiment of the present invention. FIG. 5A shows the resistance area 131 of the spacer 130 in the state in which no pressure is applied thereto, and FIG. 5B shows the resistance area 131 of the spacer 130 in the state in which pressure is applied thereto.

As shown in FIGS. 5A and 5B, the resistance area 131 may be formed such that a plurality of resistors R is inserted into the fabric in the state in which at least some of the resistors are spaced apart from each other and such that, when pressure is applied thereto, at least some of the resistors R contact each other, whereby resistance is reduced. The spacer 130 is made of porous fabric, and the resistance area 131 is formed as the result of the resistors R penetrating a porous space present in the spacer 130. The resistor R may be a small particle having electrical conductivity. For example, the resistor R may include nanobeads, carbon nanotubes, metal powder, or electrically conductive polymer particles. The resistor R may be fixed to the spacer 130 via a binder. The resistor R penetrates the position of the spacer 130 at which the resistance area 131 is to be formed in order to form the resistance area 131.

As shown in FIG. 5A, some of the resistors R in the resistance area 131 may be spaced apart from each other, and some thereof may be in contact with each other. Since at least some of the resistors R are spaced apart from each other in the state in which no pressure is applied, the value of resistance measured at the first conductive line 110 and the second conductive liner 120 that contact opposite surfaces of the resistance area 131 is greater than when pressure is applied.

When pressure is applied, as shown in FIG. 5B, the spacer 130 may be compressed in the direction in which the pressure is applied, since the spacer is made of porous fabric. The resistors R present in the porous space of the spacer 130 come into contact with each other as the spacer 130 is compressed. As a result, the resistors R present in the resistance area 131 come into contact with each other, and the value of resistance measured at the first conductive line 110 and the second conductive liner 120 that contact the opposite surfaces of the resistance area 131 is less than when no pressure is applied. As the magnitude of pressure applied to the pressure sensor is increased, the number of resistors R that contact each other is increased, whereby a low resistance value is measured. Consequently, it is possible to measure a change in magnitude of pressure based on a change in resistance value.

Figure 6:
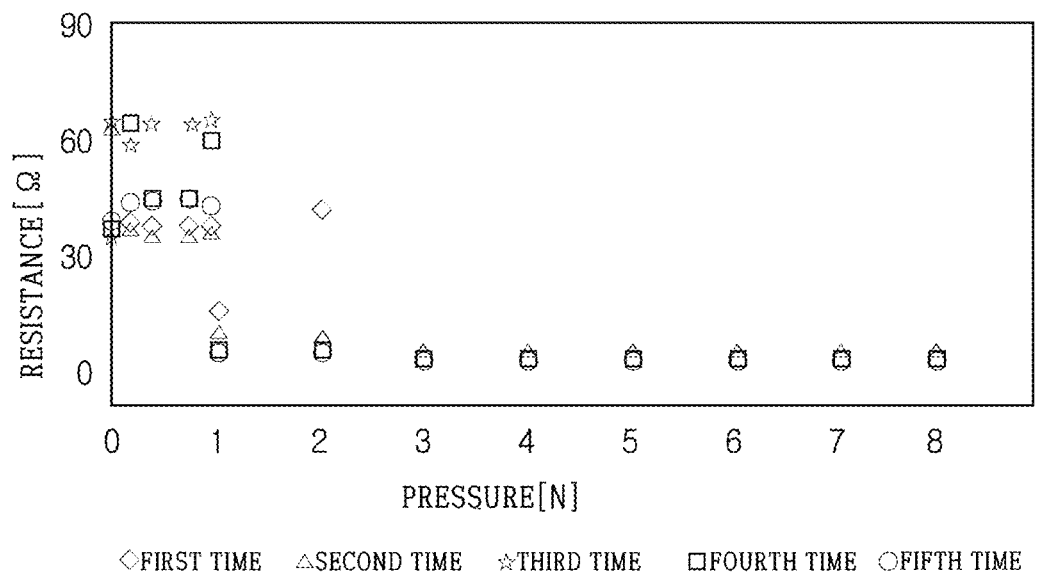
FIG. 6 is a graph showing a change in resistance when pressure is applied to Comparative Example using a thin spacer that is porous and has no resistors.
Figure 7:
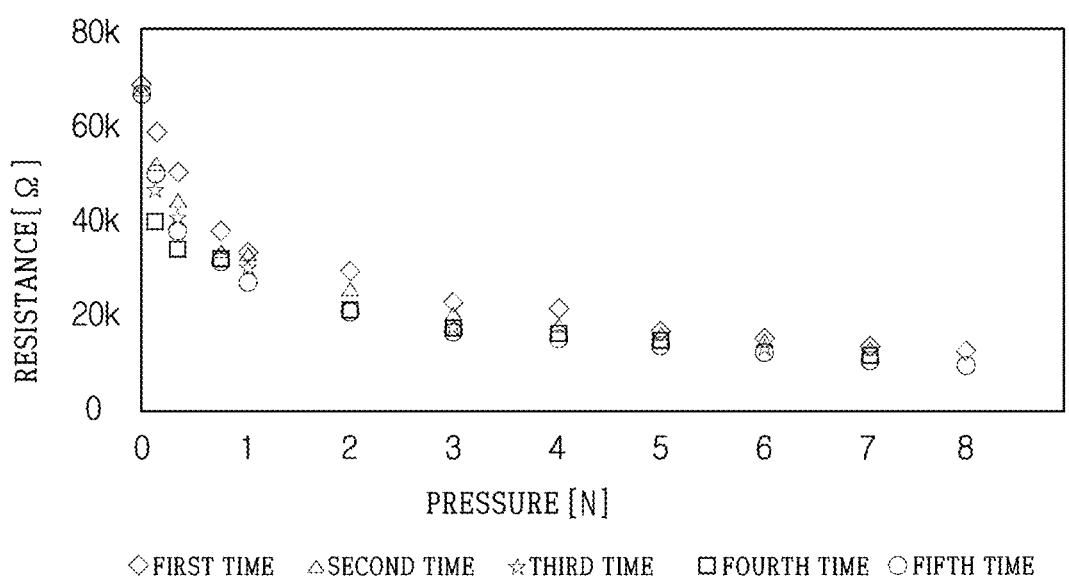
FIG. 7 is a graph showing a change in resistance when pressure is applied to Example using a thick spacer that is porous and has resistors.

FIG. 6 is a graph showing a change in resistance when pressure is applied to Comparative Example using a thin spacer 130 that is porous and has no resistors R. FIG. 7 is a graph showing a change in resistance when pressure is applied to Example using a thick spacer 130 that is porous and has resistors R. FIGS. 5A, 5B, 6, and 7 are referenced together.

FIG. 6 is a graph showing the measured results of a change in resistance when pressure is applied to a pressure sensor (Comparative Example) including a thin spacer 130 that is made of porous fabric, has a thickness of 50 µm to less than 300 µm, and has no resistance area 131. The pressure sensor according to Comparative Example has a structure in which a first conductive line 110 is formed on one surface of the spacer 130 and a second conductive line 120 is formed on the other surface of the spacer 130, and is different from the pressure sensor according to the embodiment of the present invention in terms of the thickness of the spacer 130 and whether the resistance area 131 is present. Tests were performed as follows. Pressures of 1N to 8N were sequentially applied, and resistance was measured using the first conductive line 110 and the second conductive line 120. The same tests were repeated five times. It can be seen from the test results that, when the pressures are 0N and 1N, there is no meaningful difference and a low resistance value of 30Ω (ohm) to 60Ω is obtained, that, when the pressure is 2N, the resistance is abruptly reduced to about 15Ω, and that, when the pressures are 3N to 8N, the measured resistance value is about 12Ω and thus there is little difference in resistance value even though different pressures are applied. The reason for this is that, the moment the first conductive line 110 and the second conductive line 120 come into contact with each other through the porous space of the spacer 130, the resistance value is abruptly reduced.

FIG. 7 is a graph showing the measured results of a change in resistance when pressure is applied to a pressure sensor (Example) according to an embodiment of the present invention including a thick spacer 130 that is made of porous fabric, has a thickness of 300 μm or more, and has a resistance area 131. The thickness of the spacer 130 may be the thickness of the resistance area 131. The pressure sensor according to Example is different from the pressure sensor according to Comparative Example in that the spacer 130 is thick and the resistance area 131 is present in the spacer 130. Tests were performed in the same manner as in Comparative Example. The test results show that, when the pressure is 0N, the measured resistance value is 80 kΩ, which is higher than in Comparative Example. The reason for this is that the spacer 130 is thick and the number of resistors T that contact each other in the resistance area 131 is small. It can be seen that the resistance value is continuously reduced in a period in which the pressure is increased from 0N to 1N and a period in which the pressure is increased from 1N to 8N. The reason for this is that the number of resistors T that contact each other is increased as the magnitude of pressure is increased.

It can be seen that, in Comparative Example, the resistance value is abruptly changed from a specific pressure (2N), whereas the resistance value measured in Example is continuously reduced in inverse proportion to the magnitude of pressure. That is, in Comparative Example, it is possible to distinguish between a pressure less than a specific pressure and a pressure greater than the specific pressure, whereas, in Example, it is possible to measure a wide range of pressures using a change in resistance value. That is, when the resistance area 131 having the resistors R penetrated therein is formed in the spacer 130 and the spacer 130 is formed so as to be thick, as in the embodiment of the present invention, it is possible to obtain the effect in which the range of pressures distinguishable by the pressure sensor is widened. Consequently, it is preferable for the resistance area 131 according to the embodiment of the present invention to be formed so as to have a thickness of 300 μm.

Figure 8:
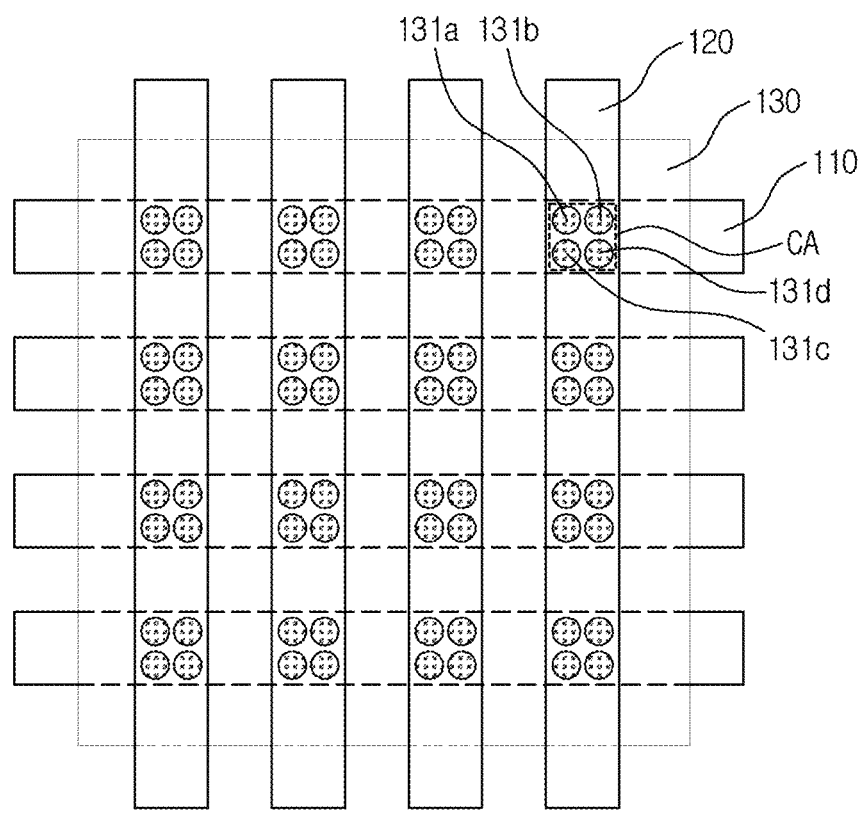
FIG. 8 is a view showing a plurality of resistance areas formed in the area in which a first conductive line and a second conductive line intersect each other in accordance with an embodiment of the present invention.

FIG. 8 is a view showing a plurality of resistance areas 131 formed in the area in which the first conductive line 110 and the second conductive line 120 intersect each other in accordance with an embodiment of the present invention.

As shown in FIG. 8, a plurality of resistance areas 131 may be formed in the cross area CA in which the first conductive line 110 and the second conductive line 120 intersect each other. For example, a first resistance area 131a, a second resistance area 131b, a third resistance area 131c, and a fourth resistance area 131d may be formed so as to be spaced apart from each other in one cross area CA. In this case, the first conductive line 110 and the second conductive line 120 contact all of the first to fourth resistance areas 131a to 131d.

When a plurality of resistance areas 131 is formed in the cross area CA, the resistance areas 131 may be formed so as to have different characteristics. The plurality of resistance areas 131 formed in the cross area CA such that the resistors R in each of the resistance areas 131 have a different density than the resistors in the other resistance areas. For example, the resistors R in the first resistance area 131a may have the highest density, the densities of the resistors R in the second resistance area 131b and the third resistance area 131c may be reduced in order, and the resistors R in the fourth resistance area 131d may have the lowest density. Since the resistance areas 131 formed so as to have different densities of the resistors R exhibit different resistance values even when the same pressure is applied thereto, it is possible to differently set a measurable pressure range for the resistance areas 131.

For example, since the first resistance area 131a has the highest density of the resistors R, resistance is the most rapidly reduced when pressure is increased. In contrast, since the fourth resistance area 131d has the lowest density of the resistors R, resistance is the most slowly reduced when pressure is increased. The first resistance area 131a to the fourth resistance area 131d are connected to each other in parallel, since the resistance areas are located in one cross area CA. Consequently, the range of resistance values measured through the first conductive line 110 and the second conductive line 120 is further widened.

In addition, the plurality of resistance areas 131 formed in the cross area CA may be formed so as to have different kinds of resistors R. When the kinds of resistors R included in the resistance areas 131 are different from each other, electrical conductivities are different from each other, and therefore it is possible to differently set a range of resistance values measured at the same pressure for the resistance areas 131.

Figure 9:
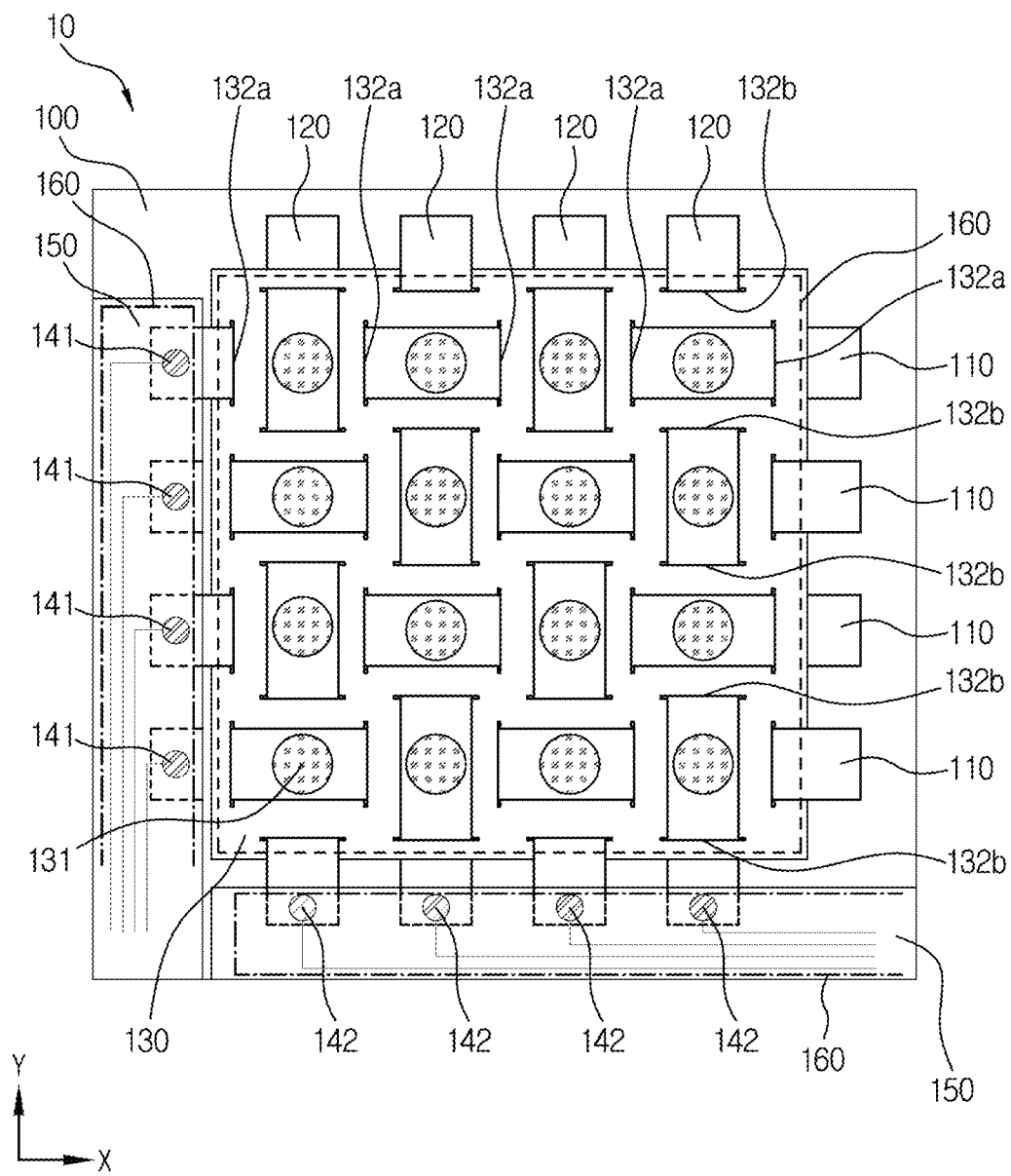
FIG. 9 is a view showing a structure in which the first conductive line and the second conductive line are coupled to the spacer while passing through slits formed in the spacer in accordance with an embodiment of the present invention.
Figure 10:
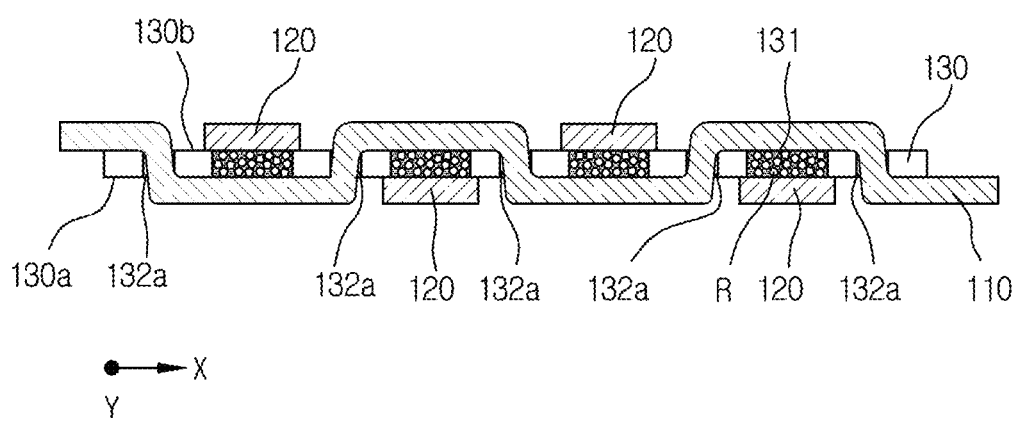
FIG. 10 is a sectional view taken along line A-A' of FIG. 9.

FIG. 9 is a view showing a structure in which the first conductive line 110 and the second conductive line 120 are coupled to the spacer 130 while passing through slits formed in the spacer 130 in accordance with an embodiment of the present invention. FIG. 10 is a sectional view taken along line A-A' of FIG. 9.

As shown in FIGS. 9 and 10, the first conductive line 110 and the second conductive line 120 may be coupled to the spacer 130 through the first surface 130a and the second surface 130b of the spacer 130. Each of the first conductive line 110 and the second conductive line 120 may be fabric made of conductive thread, and may be formed so as to have a predetermined width and length. Each of the first conductive line 110 and the second conductive line 120 may be formed in a rectangular shape having a predetermined width and length.

A slit may be formed in the spacer 130. A first slit 132a having a size corresponding to the width 110w of the first conductive line 110 may be formed between two resistance areas 131 neighboring each other in the first direction X, among the resistance areas 131 of the spacer 130, and a second slit 132b having a size corresponding to the width 120w of the second conductive line 120 may be formed between two resistance areas 131 neighboring each other in the second direction Y, among the resistance areas 131. The slit is a hole formed through the first surface 130a and the second surface 130b of the spacer 130. The slit may be formed by cutting a portion of the spacer 1130 made of porous fabric. The slit through which the first conductive line 110 passes is the first slit 132a, and the slit through which the second conductive line 120 passes is the second slit 132b. A plurality of first slits 132a is disposed in the first direction X, which is parallel to a longitudinal direction of the first conductive line 110. The first slits 132a and the resistance areas 131 are alternately formed in the spacer 130. The first slit 132a is formed so as to be slightly larger than the width 110w of the first conductive line 110 such that the first conductive line 110 can pass through the first slit. A plurality of second slits 132b is disposed in the second direction Y, which is parallel to a longitudinal direction of the second conductive line 120. The second slits 132b and the resistance areas 131 are alternately formed in the spacer 130. The second slit 132b is formed so as to be slightly larger than the width 120*w* of the second conductive line 120 such that the second conductive line 120 can pass through the second slit.

The first conductive line 110 is formed so as to pass through one first slit 132*a* from the first surface 130*a* to the second surface 130*b* of the spacer 130 and to pass through another first slit 132*a* closest thereto from the second surface 130*b* to the first surface 130*a* of the spacer 130. The second conductive line 120 is formed so as to pass through one second slit 132*b* from the second surface 130*b* to the first surface 130*a* of the spacer 130 and to pass through another second slit 132*b* closest thereto from the first surface 130*a* to the second surface 130*b* of the spacer 130. As a result, the first conductive lines 110 and the second conductive lines 120 are formed so as to be alternately located on the first surface 130*a* of the spacer 130.

The first conductive line 110 passes through a plurality of first slits 132*a* present in the first direction X and is then coupled to the spacer 130. The first conductive line 110 passes through one first slit 132*a* from the first surface 130*a* to the second surface 130*b* of the spacer 130, passes through another first slit 132*a* from the second surface 130*b* to the first surface 130*a* of the spacer 130, and passes through another first slit 132*a* from the first surface 130*a* to the second surface 130*b* of the spacer 130, which are repeated, and is then coupled to the spacer 130. At this time, the resistance area 131 is located between one first slit 132*a* and the next first slit 132*a*.

Similarly, the second conductive line 120 passes through a plurality of second slits 132*b* present in the second direction Y and is then coupled to the spacer 130. The second conductive line 120 passes through one second slit 132*b* from the second surface 130*b* to the first surface 130*a* of the spacer 130, passes through another second slit 132*b* from the first surface 130*a* to the second surface 130*b* of the spacer 130, and passes through another second slit 132*b* from the second surface 130*b* to the first surface 130*a* of the spacer 130, which are repeated, and is then coupled to the spacer 130. At this time, the resistance area 131 is located between one second slit 132*b* and the next second slit 132*b*.

Here, the first conductive line 110 and the second conductive line 120 pass through the slits of the spacer so as to contact one surface and the other surface of one resistance area 131. When the plurality of first conductive lines 110 and the plurality of second conductive lines 120 are coupled to the spacer 130 while passing through the slits of the spacer 130, therefore, a shape that is generally similar to a chessboard is formed. That is, the first conductive lines 110 and the second conductive lines 120 are alternately located.

When the first and second conductive lines 110 and 120 are coupled to the spacer 130 while passing through the slits formed in the spacer 130, a sewing process for coupling the first and second conductive lines 110 and 120 to the spacer 130 is not necessary. In addition, since the first and second conductive lines 110 and 120 pass through the slits formed in the spacer 130 by cutting, the first conductive line 110, the second conductive line 120, and the resistance area 131 are excellently aligned.

FIGS. 11 to 14 are views showing steps of a method of manufacturing a pressure sensor 10 using conductive thread according to an embodiment of the present invention.

The method of manufacturing the pressure sensor 10 using conductive thread according to the embodiment of the present invention may include a step of preparing a plurality of first conductive lines 110 and a plurality of second conductive lines 120, a step of preparing a spacer 130 having a plurality of pressure areas formed therein, the spacer being configured such that resistance of the spacer is changed when pressure is applied thereto, a step of disposing the plurality of first conductive lines 110 so as to be spaced apart from each other in a state of being parallel to each other in a first direction X and disposing the plurality of second conductive lines 120 so as to be spaced apart from each other in a state of being parallel to each other in a second direction Y intersecting the first direction X, a step of coupling the first conductive line 110 and the second conductive line 120 to the spacer 130 such that the spacer 130 is disposed between the first conductive line and the second conductive line, and a step of connecting a first electrode 141 to one end of the first conductive line 110, connecting a second electrode 142 to one end of the second conductive line 120, and coupling a cover sheet 150 configured to cover the area in which the electrodes are connected to each other.

The step of preparing a first conductive line 110 and a second conductive line 120 is a process of forming conductive lines using conductive thread. Fabric made of conductive thread is cut to a predetermined width and length to form the first conductive line 110 and the second conductive line 120. A plurality of first conductive lines 110 and a plurality of second conductive lines 120 are prepared.

The step of preparing a spacer 130 is a process of injecting resistors R into a spacer 130 made of porous fabric to form a resistance area 131. The step of preparing a spacer 130 includes a resistance area formation step of forming resistors R in a cross area CA of a spacer 130 made of porous fabric in which the first conductive line 110 and the second conductive line 120 intersect each other. A plurality of resistance areas 131 may be formed so as to correspond to the cross areas CA. The resistance area formation step may include a step of allowing a solution including resistors R to permeate the resistance area 131 and a step of thermally treating the spacer 130 to fix the resistors R to the porous fabric. The solution including resistors R may be formed by mixing resistors R having electrical conductivity, a binder configured to fix the resistors R to the spacer 130, and a solvent configured to mix the resistors R and the binder with each other so as to be dispersed in a liquid form. The resistance area 131 may be formed by injecting the solution including resistors R into the spacer 130 using screen printing, coating opposite surfaces of the spacer 130 with resistors R, or coupling resistors R to the spacer 130 using a double-sided adhesive. In addition, the resistors R may permeate into a porous space of the spacer 130, and then the spacer 130 may be thermally treated. When heat treatment is performed, the solvent included in the solution is evaporated, and the resistors R and the binder are coupled to each other in the porous space of the spacer 130, whereby the resistance area 131 is formed.

The first conductive line 110, the second conductive line 120, and the spacer 130 are prepared through the above processes.

Subsequently, a step of coupling the first conductive line 110 and the second conductive line 120 to the spacer 130 is performed. The step of coupling the first conductive line 110 and the second conductive line 120 to the spacer 130 includes a step of coupling the plurality of first conductive lines 110 to a base sheet so as to be spaced apart from each other in a state of being parallel to each other in a first direction X, a step of coupling the spacer 130 to the base sheet such that the spacer covers the first conductive line 110 and such that the resistance areas 131 overlap the first conductive lines 110, and a step of coupling the plurality of second conductive lines 120 to the base sheet so as to be spaced apart from each other in a state of being parallel to each other in a second direction Y intersecting the first direction X such that the second conductive lines cover the resistance areas 131.

Figure 11:
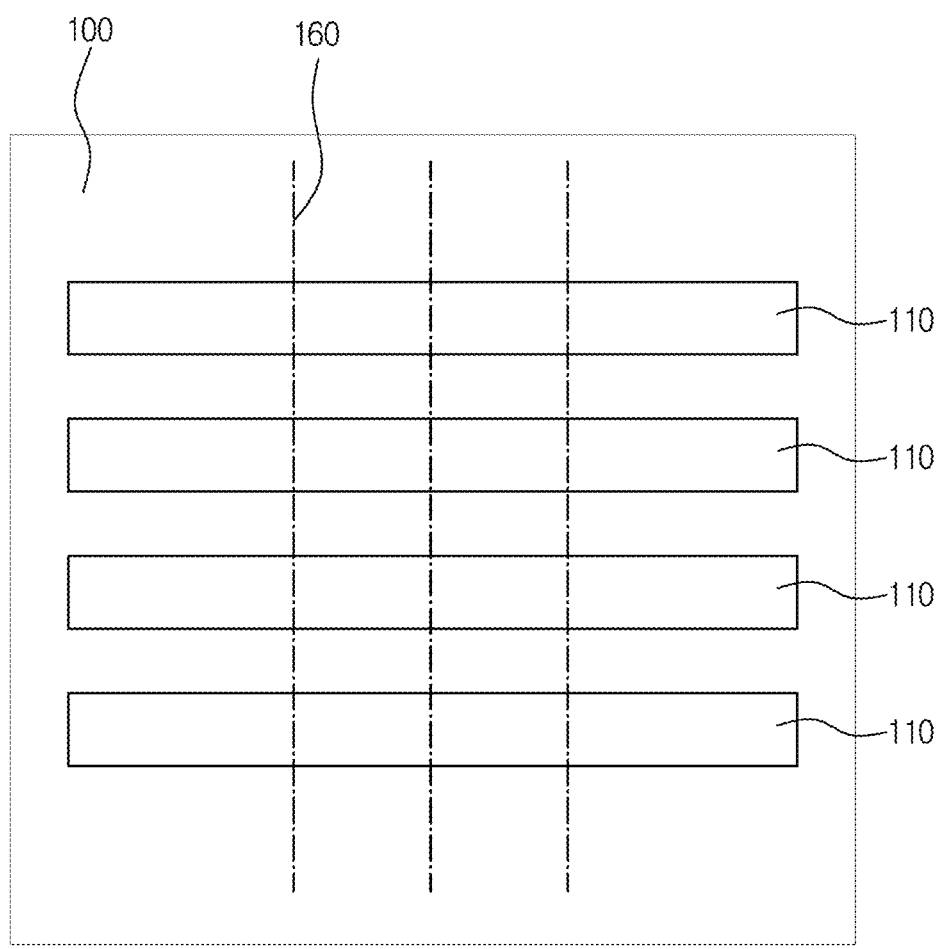
FIGS. 11 to 14 are views showing steps of a method of manufacturing a pressure sensor using conductive thread according to an embodiment of the present invention.

FIG. 11 is a view showing the state in which the first conductive line 110 is coupled to the base sheet. As shown in FIG. 11, the plurality of first conductive lines 110 is coupled to the base sheet. The base sheet is an element configured to allow the first conductive line 110, the second conductive line 120, the spacer 130, the electrodes, and the cover sheet 150 to be coupled thereto and to support the same. The first conductive line 110 and the base sheet may be coupled to each other using a sewing line 160. The sewing line 160 is a line of sewing the first conductive line 110 and the base sheet. A plurality of sewing lines 160 may be formed parallel to each other in the second direction Y intersecting the first conductive line 110. The first conductive lines 110 may be spaced apart from each other and may be disposed parallel to each other in the first direction X.

Figure 12:
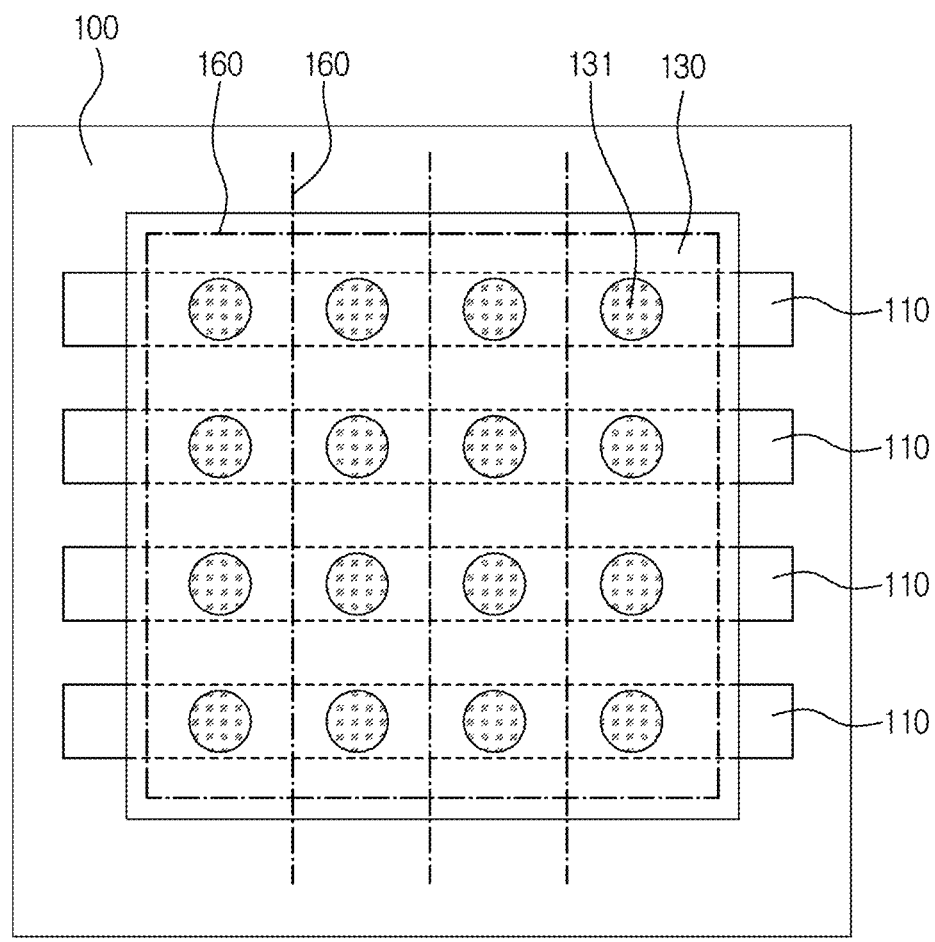

FIG. 12 is a view showing the state in which the spacer 130 is coupled to the base sheet. As shown in FIG. 12, the spacer 130 is coupled to the base sheet so as to cover the first conductive line 110. The resistance area 131 of the spacer 130 is disposed so as to be located at the first conductive line 110. The spacer 130 may be disposed so as to cover the first conductive line 110, and may be coupled to the first conductive line 110 and the base sheet using a sewing line 160 formed at the circumference of the spacer 130.

Figure 13:
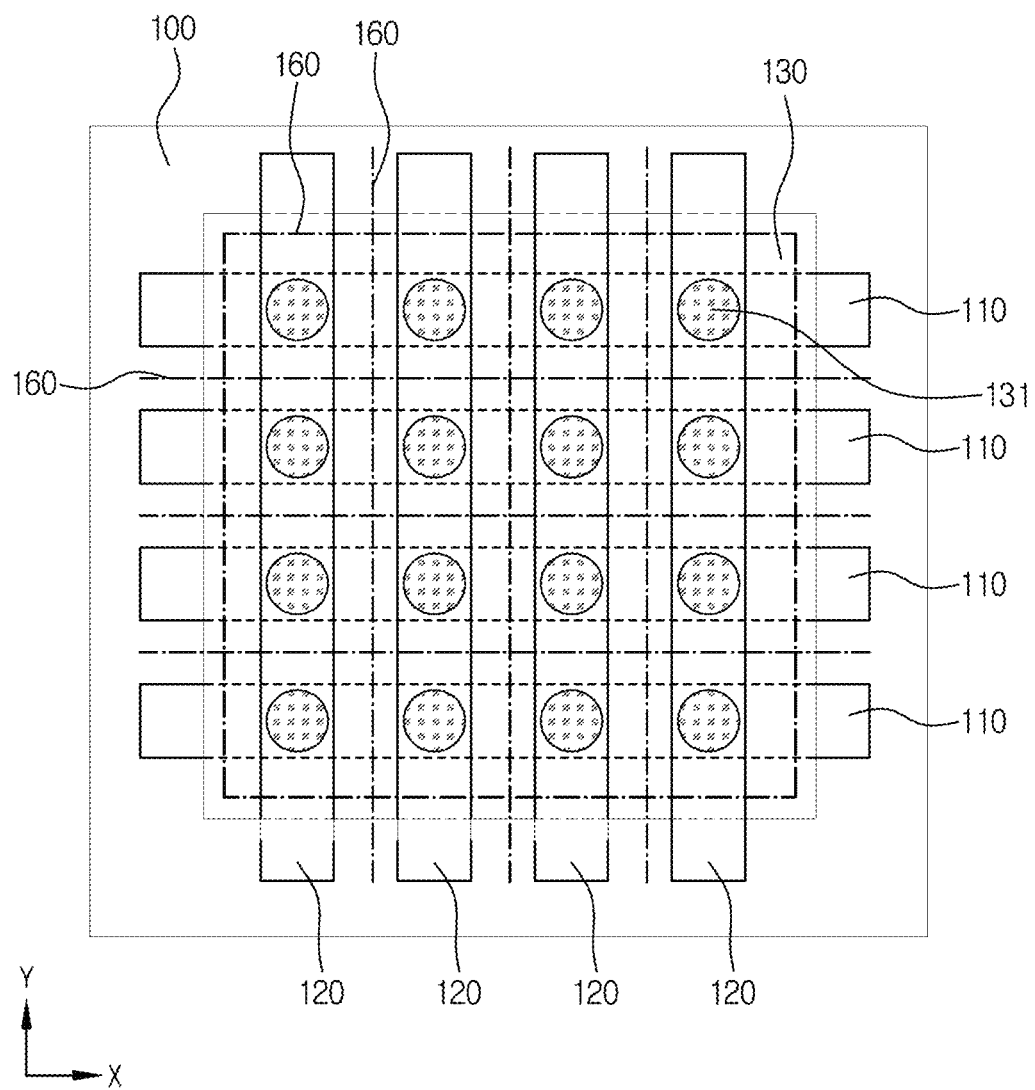

FIG. 13 is a view showing the state in which the second conductive line 120 is coupled to the base sheet. As shown in FIG. 13, the second conductive line 120 is coupled to the base sheet so as to be located on the spacer 130. The second conductive line 120 is disposed so as to cover the resistance area 131 of the spacer 130. The second conductive lines 120 may be spaced apart from each other and may be disposed parallel to each other in the second direction Y intersecting the first conductive line 110. The second conductive line 120 may be coupled to the spacer 130 and the base sheet using a sewing line 160. The sewing line 160 may be formed in the first direction X intersecting the second conductive line 120.

Figure 14:
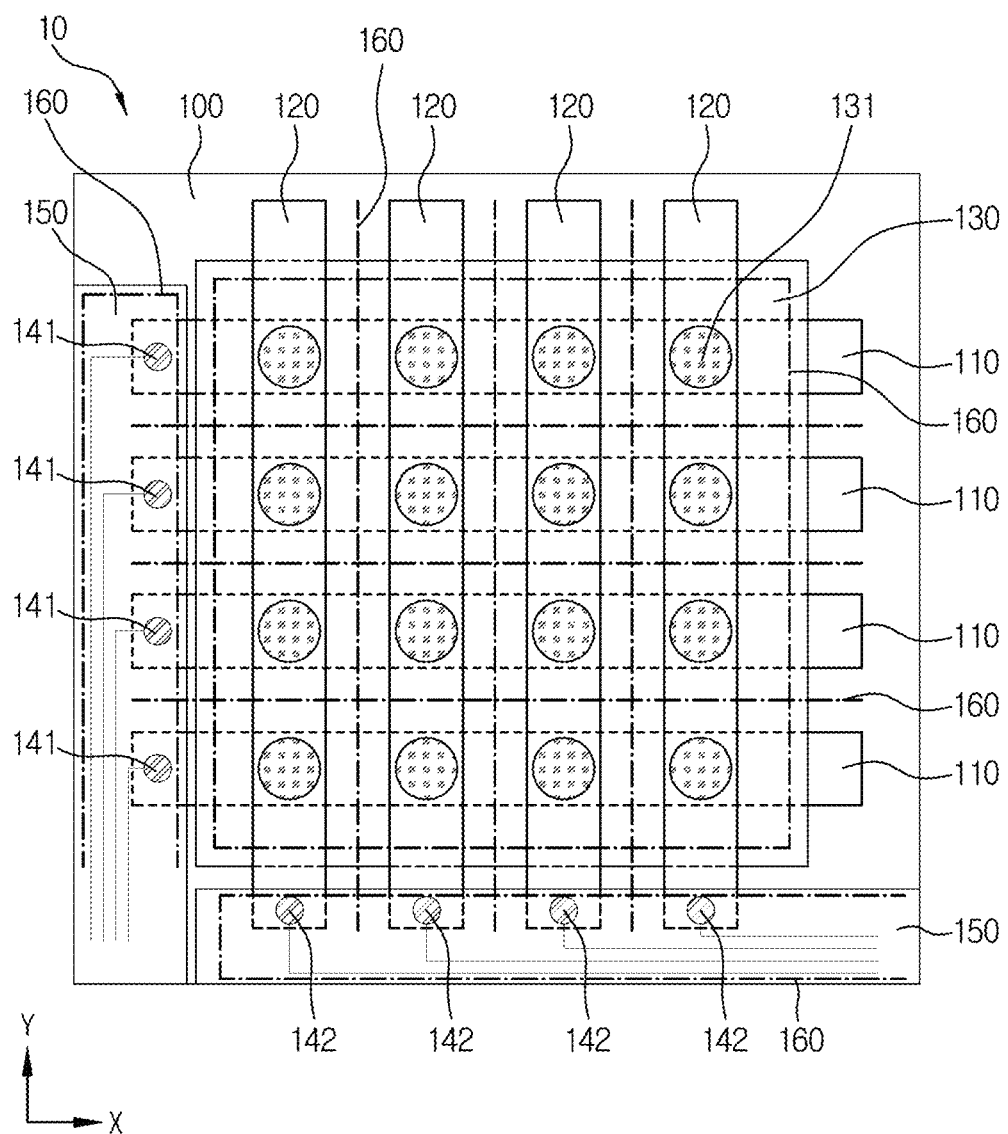

FIG. 14 is a view showing the state in which the first electrode 141 and the second electrode 142 are coupled and the cover sheet 150 is further coupled. As shown in FIG. 14, the first electrode 141 is connected to one end of the first conductive line 110. The first electrode 141 is connected to each first conductive line 110. One end of the first electrode 141 may be connected to the conductive line, and the other end of the first electrode 141 may be connected to an external circuit. Similarly, the second electrode 142 is connected to one end of the second conductive line 120. The second electrode 142 is connected to each second conductive line 120. One end of the second electrode 142 may be connected to the conductive line, and the other end of the second electrode 142 may be connected to the external circuit. Each of the first electrode 141 and the second electrode 142 may be made of an electric wire.

The cover sheet 150 may be coupled to the base sheet using the sewing line 160 so as to cover the area in which the first electrode 141 and the first conductive line 110 are coupled to each other. The cover sheet 150 may be coupled to the base sheet using the sewing line 160 so as to cover the area in which the second electrode 142 and the second conductive line 120 are coupled to each other. The sewing line 160 may be formed along the circumference of the cover sheet 150 so as to protect the portion at which the electrode and the conductive line are connected to each other and to protect the electrode.

The pressure sensor, in which all of the base sheet, the first conductive line 110, the second conductive line 120, and the spacer 140 are made of fabric, may be manufactured using the method according to the embodiment of the present invention. When the pressure sensor is applied to clothing, therefore, the pressure sensor may be adapted to various kinds of deformation.

Meanwhile, in the resistance area formation step, a plurality of resistance areas 131 may be formed. The resistance area formation step may include a step of allowing a solution including a first concentration of resistors R to permeate a portion of the cross area CA in which the first conductive line 110 and the second conductive line 120 intersect each other to form a first concentration of resistance area 131, a step of allowing a solution including a second concentration of resistors R to permeate another portion of the cross area CA in which the first conductive line 110 and the second conductive line 120 intersect each other to form a second concentration of resistance area 131, and a step of thermally treating the spacer 130 such that the resistors R are fixed to the porous fabric to form one or more resistance areas 131 having different concentrations in a portion of the cross area CA in which the first conductive line 110 and the second conductive line 120 intersect each other. When formation of the first concentration of resistance area 131 using the solution including the first concentration of resistors R and formation of the second concentration of resistance area 131 using the solution including the second concentration of resistors R are repeated, first to fourth resistance areas 131*a* to 131*d* may be formed in one cross area CA, as shown in FIG. 8. Heat treatment may be performed after injecting a solution into the first to fourth resistance areas 131*a* to 131*d*, whereby the first to fourth resistance areas 131*a* to 131*d* may be thermally treated at once. When the spacer 130 is formed using the above method, heat treatment may be performed at once, although work is repeatedly performed using solutions having different concentrations.

Figure 15:
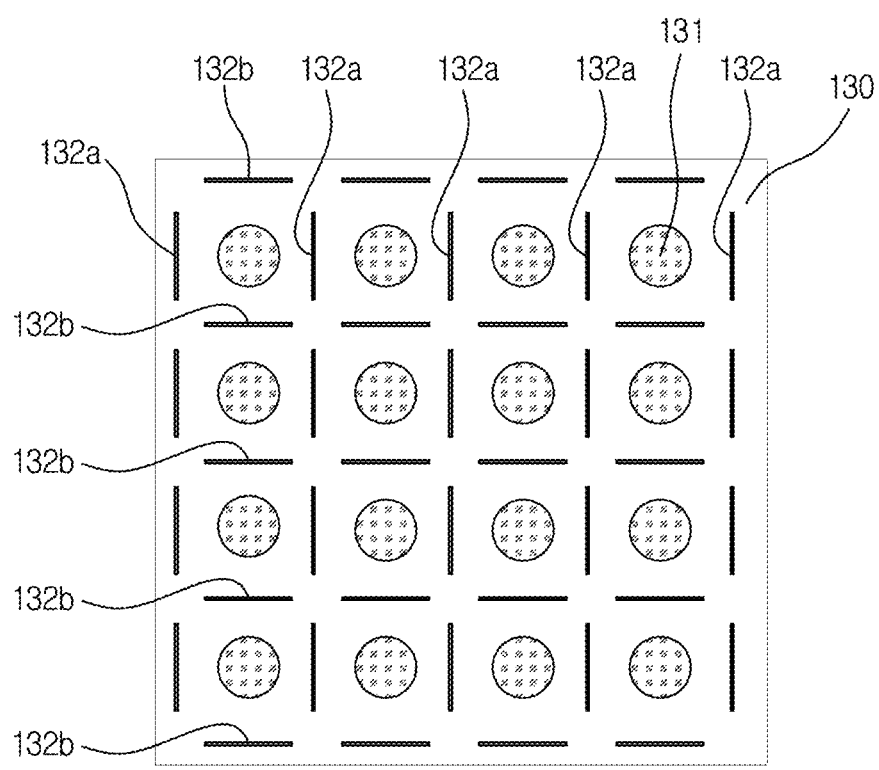
FIGS. 15 to 17 are views showing steps of a method of manufacturing a pressure sensor using conductive thread having a structure in which a first conductive line and a second conductive line are coupled to a spacer while passing through slits formed in the spacer in accordance with an embodiment of the present invention.
Figure 16:
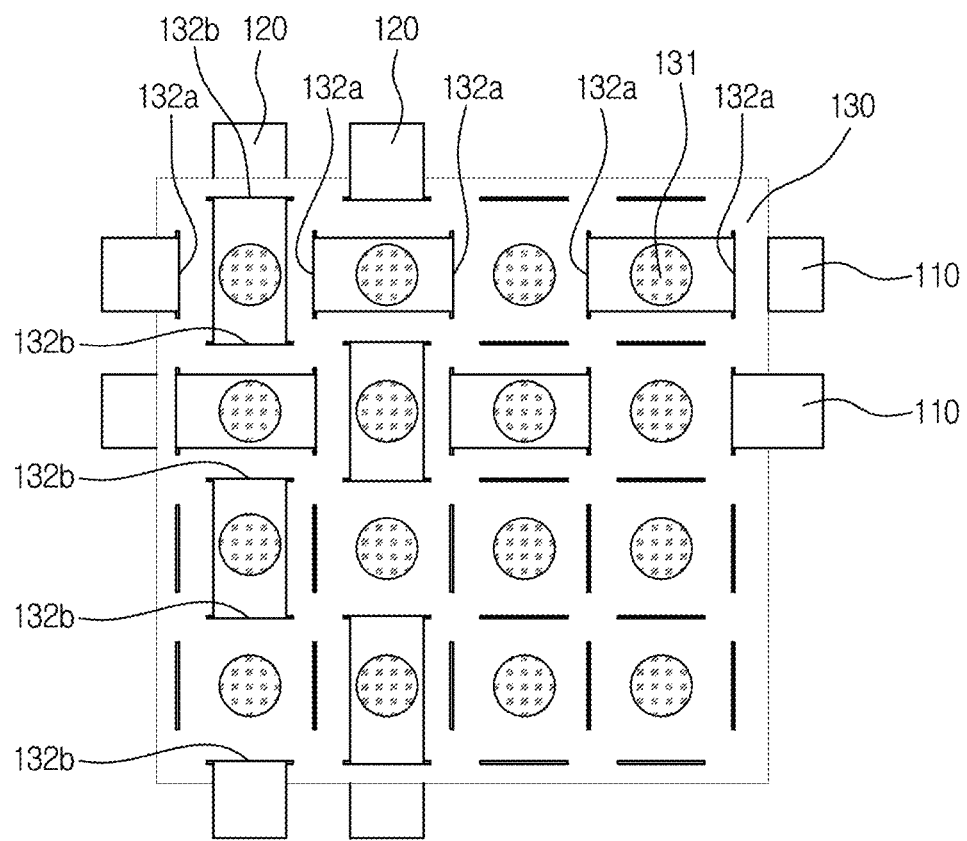
Figure 17:
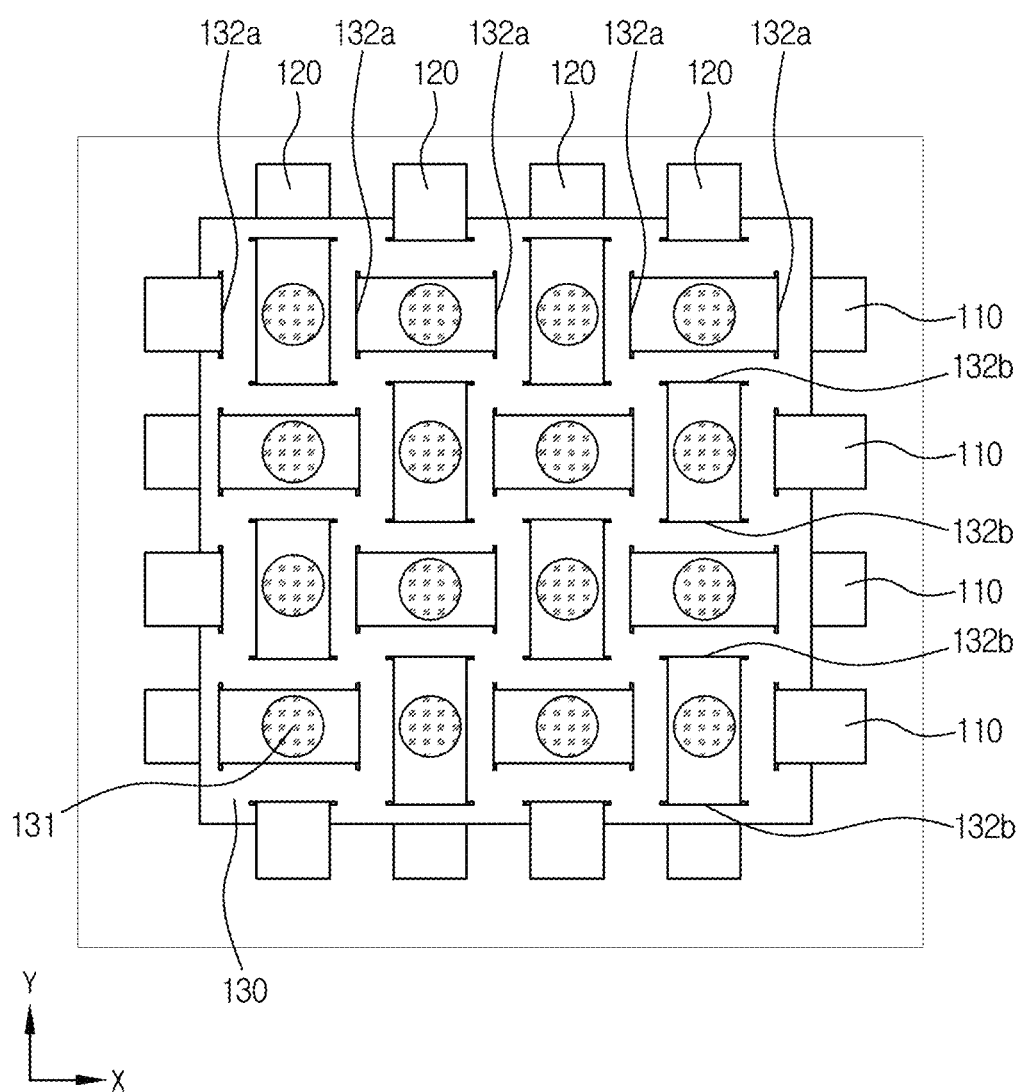

FIGS. 15 to 17 are views showing steps of a method of manufacturing a pressure sensor 10 using conductive thread having a structure in which a first conductive line 110 and a second conductive line 120 are coupled to a spacer 130 while passing through slits formed in the spacer 130 in accordance with an embodiment of the present invention.

The first conductive line 110, the second conductive line 120, and the spacer 130 are prepared in the same manner as described above.

A step of coupling the first conductive line 110 and the second conductive line 120 to the spacer 130 may include a slit formation step of forming a first slit 132*a* corresponding to the width 110*w* of the first conductive line 110 between two resistance areas 131 parallel to each other in the first direction X, among a plurality of resistance areas 131 formed in the spacer 130, and forming a second slit 132*b* corresponding to the width 120*w* of the second conductive line 120 between two resistance areas 131 parallel to each other in the second direction Y, a slit passing step of allowing the first conductive line 110 to pass through one first slit 132*a* from the first surface 130*a* to the second surface 130*b* of the spacer 130 and to pass through another first slit 132*a* closest thereto from the second surface 130*b* to the first surface 130*a* of the spacer 130, allowing the second conductive line 120 to pass through one second slit 132*b* from the second surface 130*b* to the first surface 130*a* of the spacer 130 and to pass through another second slit 132*b* closest thereto from the first surface 130*a* to the second surface 130*b* of the spacer 130, thereby coupling the first conductive line 110 and the second conductive line 120 to the spacer 130 such that the first conductive line 110 and the second conductive line 120 are alternately located on the first surface 130a of the spacer 130, and a step of coupling the first conductive line 110, the second conductive line 120, and the spacer 130, coupled through the first slit 132a and the second slit 132b, to a base sheet.

FIG. 15 is a view showing the state in which a slit is formed in the spacer 130. The spacer 130 is provided with resistance areas 131 formed in the spacer preparation step. The first slit 132a may be formed between two resistance areas 131. In other words, the first slits may be formed at opposite sides of the resistance area 131. In other words, the first slits 132a may be formed such that the first slits 132a and the resistance areas 131 are alternately disposed. A plurality of first slits 132a is formed so as to be spaced apart from the resistance areas 131 in the first direction X. The first slit 132a has a size corresponding to the width 110w of the first conductive line 110, and is formed lengthily in the second direction Y. Similarly, the second slit 132b may be formed between two resistance areas 131. In other words, the second slits may be formed at opposite sides of the resistance area 131. In other words, the second slits 132b may be formed such that the second slits 132b and the resistance areas 131 are alternately disposed. A plurality of second slits 132b is formed so as to be spaced apart from the resistance areas 131 in the second direction Y. The second slit 132b has a size corresponding to the width 120w of the second conductive line 120, and is formed lengthily in the first direction X. Each of the first slit 132a and the second slit 132b is formed by cutting a portion of the spacer 130 so as to be formed through the first surface 130a and the second surface 130b of the spacer 130.

FIG. 16 shows the state in which some of the first conductive lines 110 and the second conductive lines 120 are coupled to the spacer 130 while passing therethrough. The first conductive line 110 passes through first slits 132a arranged in the first direction X in such a manner that the first conductive line passes through one slit from the first surface 130a to the second surface 130b of the spacer 130 and then passes through the next slit from the second surface 130b to the first surface 130a of the spacer 130, which is repeated. Similarly, the second conductive line 120 passes through second slits 132b arranged in the second direction Y in such a manner that the second conductive line passes through one slit from the second surface 130b to the first surface 130a of the spacer 130 and then passes through the next slit from the first surface 130a to the second surface 130b of the spacer 130, which is repeated.

FIG. 17 shows the state in which all of the first conductive lines 110 and the second conductive lines 120 are coupled to the spacer 130. When the plurality of first conductive lines 110 and the plurality of second conductive lines 120 are all coupled to the spacer 130, a shape similar to a chessboard is formed. The first conductive lines 110 and the second conductive lines 120 are alternately located in the first direction X, and the first conductive lines 110 and the second conductive lines 120 are also alternately located in the second direction Y. When the conductive lines are coupled to the spacer 130 while passing through the slits, as described above, the process of forming the sewing line 160, described with reference to FIGS. 11 to 13, may be omitted.

After the first conductive lines 110 and the second conductive lines 120 are coupled to the spacer 130, the spacer 130 may be coupled to a base sheet using a sewing line 160, first electrodes 141 and second electrodes 142 may be formed, and a cover sheet 150 may be coupled, whereby a pressure sensor 10 using conductive thread may be manufactured.

As is apparent from the above description, according to the embodiment of the present invention, a spacer made of porous fabric configured such that resistance of the spacer is changed when pressure is applied thereto is disposed between a first conductive line and a second conductive line formed using fabric made of conductive thread, whereby it is possible to provide an elastic and flexible pressure sensor.

In addition, according to the embodiment of the present invention, resistors permeate the area of the spacer corresponding to the area in which the first conductive line and the second conductive line intersect each other to form a resistance area, and pressure is sensed using a change in resistance of the resistance area generated when pressure is applied thereto, whereby it is possible to measure a wide range of pressure with elasticity and flexibility.

Although the present invention has been described in detail with reference to the embodiments, the embodiments are provided to describe the present invention in detail, the present invention is not limited thereto, and the present invention can be modified or improved by a person having ordinary skill in the art to which the preset invention pertains within the technical idea of the invention.

Simple modifications and changes of the present invention are to be appreciated as being included within the scope and spirit of the invention, and the protection scope of the present invention will be defined by the accompanying claims.

What is claimed is:

1. A pressure sensor using conductive thread, the pressure sensor comprising:
    a plurality of first conductive lines arranged parallel to each other in a first direction in a state of being spaced apart from each other;
    a plurality of second conductive lines arranged parallel to each other in a second direction intersecting the first direction in a state of being spaced apart from each other; and
    a spacer located between the plurality of first conductive lines and the plurality of second conductive lines, resistance of the spacer being changed when pressure is applied thereto,
    wherein the spacer comprises a plurality of resistance areas each formed in a cross area in which each of the plurality of first conductive lines and a corresponding one of the plurality of second conductive lines intersect each other, resistance of the resistance areas configured to be changed in response to a change in pressure, and
    wherein:
    each of the first conductive lines and the second conductive lines is fabric made of conductive thread and has a predetermined width and length,
    the spacer is configured such that:
    a first slit having a size corresponding to a width of a first conductive line of the plurality of first conductive lines is formed between two resistance areas neighboring each other in the first direction, among the resistance areas, and
    the first conductive line is formed so as to pass through the first slit from a first surface to a second surface of the spacer and to pass through another first slit closest thereto from the second surface to the first surface of the spacer.

2. The pressure sensor according to claim 1, wherein:
    the spacer is made of porous fabric, and the resistance areas are formed such that a plurality of resistors are inserted into the fabric in a state in which at least some of the resistors are spaced apart from each other and such that, when pressure is applied thereto, at least some of the resistors contact each other, whereby resistance is reduced.

3. The pressure sensor according to claim 1, wherein the plurality of resistance areas are formed such that the resistors in each of the resistance areas have a different density than the resistors in the other resistance areas.

4. The pressure sensor according to claim 1, wherein:
the spacer is further configured such that:
a second slit having a size corresponding to a width of a second conductive line of the plurality of second conductive lines is formed between two resistance areas neighboring each other in the second direction, among the resistance areas,
the second conductive line is formed so as to pass through the second slit from the second surface to the first surface of the spacer and to pass through another second slit closest thereto from the first surface to the second surface of the spacer, and
the first conductive lines and the second conductive lines are formed so as to be alternately located on the first surface of the spacer.

5. The pressure sensor according to claim 1, further comprising:
a base sheet configured to support the first conductive lines, the spacer, and the second conductive lines;
a plurality of first electrodes, each of which is connected to one end of a corresponding one of the plurality of first conductive lines;
a plurality of second electrodes, each of which is connected to one end of a corresponding one of the plurality of second conductive lines;
a seam configured to fix the base sheet, the first conductive lines, the spacer, and the second conductive lines; and
a cover sheet configured to cover a connection portion between the first electrodes and the first conductive lines and a connection portion between the second electrodes and the second conductive lines,
wherein each of the first conductive lines and the second conductive lines is fabric made of conductive thread and has a predetermined width and length.

6. The pressure sensor according to claim 1, wherein each of the resistance areas is formed so as to have a thickness of 300 μm or more.

7. A method of manufacturing a pressure sensor using conductive thread, the method comprising:
preparing a plurality of first conductive lines and a plurality of second conductive lines;
preparing a spacer having a plurality of pressure areas formed therein, the spacer being configured such that resistance of the spacer is changed when pressure is applied thereto;
disposing the plurality of first conductive lines so as to be spaced apart from each other in a state of being parallel to each other in a first direction, disposing the plurality of second conductive lines so as to be spaced apart from each other in a state of being parallel to each other in a second direction intersecting the first direction, and coupling the first conductive lines and the second conductive lines to the spacer such that the spacer is disposed between the first conductive lines and the second conductive lines; and
connecting a first electrode to one end of a first conductive line of the plurality of first conductive lines, connecting a second electrode to one end of a second conductive line of the plurality of second conductive lines, and coupling a cover sheet configured to cover an area in which the electrodes are connected to each other,
wherein preparing the spacer comprises forming resistors in resistance areas each formed in a cross area in which the first conductive lines and the second conductive lines intersect each other, and
wherein forming the resistors comprises:
allowing a solution comprising a first concentration of the resistors to permeate a portion of the cross area to form a first concentration of a first resistance area of the resistance areas; and
allowing a solution comprising a second concentration of the resistors to permeate another portion of the cross area to form a second concentration of a second resistance area of the resistance areas.

8. The method according to claim 7, wherein forming the resistors further comprises:
thermally treating the spacer such that the resistors are fixed to a porous fabric to form one or more resistance areas having different concentrations in a portion of the cross area.

9. The method according to claim 7, wherein coupling the first conductive lines and the second conductive lines to the spacer comprises:
coupling the plurality of first conductive lines to a base sheet so as to be spaced apart from each other in a state of being parallel to each other in the first direction;
coupling the spacer to the base sheet such that the spacer covers the first conductive lines and such that resistance areas overlap the first conductive lines; and
coupling the plurality of second conductive lines to the base sheet so as to be spaced apart from each other in a state of being parallel to each other in the second direction intersecting the first direction such that the second conductive lines cover the resistance areas.

10. A method of manufacturing a pressure sensor using conductive thread, the method comprising:
preparing a plurality of first conductive lines and a plurality of second conductive lines;
preparing a spacer having a plurality of pressure areas formed therein, the spacer being configured such that resistance of the spacer is changed when pressure is applied thereto;
disposing the plurality of first conductive lines so as to be spaced apart from each other in a state of being parallel to each other in a first direction, disposing the plurality of second conductive lines so as to be spaced apart from each other in a state of being parallel to each other in a second direction intersecting the first direction, and coupling the first conductive lines and the second conductive lines to the spacer such that the spacer is disposed between the first conductive lines and the second conductive lines; and
connecting a first electrode to one end of a first conductive line of the plurality of first conductive lines, connecting a second electrode to one end of a second conductive line of the plurality of second conductive lines, and coupling a cover sheet configured to cover an area in which the electrodes are connected to each other,
wherein coupling the first conductive lines and the second conductive lines to the spacer comprises:
forming a first slit corresponding to a width of a first conductive line of the plurality of first conductive lines between two resistance areas parallel to each other in the first direction, among a plurality of resistance areas formed in the spacer; and allowing the first conductive line to pass through the first slit from a first surface to a second surface of the spacer and to pass through another first slit closest thereto from the second surface to the first surface of the spacer.

11. The method according to claim 10, wherein coupling the first conductive line and the second conductive line to the spacer further comprises:

forming a second slit corresponding to a width of a second conductive line of the plurality of second conductive lines between two resistance areas parallel to each other in the second direction;

allowing the second conductive line to pass through the second slit from the second surface to the first surface of the spacer and to pass through another second slit closest thereto from the first surface to the second surface of the spacer;

coupling the first conductive lines and the second conductive lines to the spacer such that the first conductive lines and the second conductive lines are alternately located on the first surface of the spacer; and coupling the first conductive lines, the second conductive lines, and the spacer, coupled through the first slit and the second slit, to a base sheet.

\* \* \* \* \*